(12) United States Patent
Wright

(10) Patent No.: US 11,875,440 B2
(45) Date of Patent: Jan. 16, 2024

(54) SYSTEMS AND METHODS FOR ANIMATION

(71) Applicant: Jay Wright, Eureka, CA (US)

(72) Inventor: Jay Wright, Eureka, CA (US)

(*) Notice: Subject to any disclaimer, the term of this patent is extended or adjusted under 35 U.S.C. 154(b) by 1 day.

(21) Appl. No.: 17/244,364

(22) Filed: Apr. 29, 2021

(65) Prior Publication Data

US 2021/0248800 A1 Aug. 12, 2021

Related U.S. Application Data

(63) Continuation-in-part of application No. 15/932,441, filed on Feb. 5, 2018, now abandoned.

(51) Int. Cl.
| | |
|---|---|
| *G06T 15/00* | (2011.01) |
| *G06T 13/20* | (2011.01) |
| *G06F 30/20* | (2020.01) |
| *G06T 17/00* | (2006.01) |
| *G06F 113/10* | (2020.01) |

(52) U.S. Cl.
CPC ............. *G06T 13/20* (2013.01); *G06F 30/20* (2020.01); *G06T 17/00* (2013.01); *G06F 2113/10* (2020.01)

(58) Field of Classification Search
CPC ......... G06T 19/00; G06T 17/20; G06T 17/00; G06T 15/10; G06T 15/00

USPC ........................................................ 345/419
See application file for complete search history.

(56) References Cited

U.S. PATENT DOCUMENTS

| | | | |
|---|---|---|---|
| 2008/0111816 A1* | 5/2008 | Abraham | G06Q 30/06 |
| | | | 345/420 |
| 2009/0118852 A1* | 5/2009 | Kumar | G06F 30/20 |
| | | | 700/98 |
| 2017/0181798 A1* | 6/2017 | Panescu | A61B 1/0655 |

* cited by examiner

*Primary Examiner* — Gordon G Liu
(74) *Attorney, Agent, or Firm* — Nathan Camuti; Amir V. Adibi; Andrew C. Palmer

(57) ABSTRACT

A system for creating an animation including a non-transitory memory storing an executable code, a hardware processor executing the executable code to receive a first scene input including a plurality of scene elements from an input device, create a three-dimensional (3D) digital representation of each of the plurality of scene elements in the first scene input, transmit the 3D digital representation of the plurality of scene elements in the first scene input for physical production, receive a first scene capture depicting the physical 3D reproductions of the plurality of scene elements of the first scene input arranged to recreate the first scene input from a recording device, process the first scene capture for display, and transmit the first scene capture for display.

20 Claims, 2 Drawing Sheets

SYSTEMS AND METHODS FOR ANIMATION

RELATED APPLICATION(S)

The present application claims the benefit of and priority to a U.S. patent application Ser. No. 15/932,441, filed Feb. 5, 2018, which is hereby incorporated by reference in its entirety into the present application.

BACKGROUND

Field of the Invention

The field of the invention relates to animation for motion pictures, industrial visualization and implementation, and virtual environments; specifically, the creation of individual and sets of animation cells or frames three-dimensional (3D) replication tools such as 3D printers, CNC (computer numerical control) machines and 3D relief machines.

Description of the Related Art

There are many animation techniques for motion pictures, industrial visualization and implementation, and virtual environments. In general, there have been three types: (1.) direct manipulation of the motion picture stock, (2.) re-photographed drawings or (3.) computer signal output to digital two-dimensional (2D) motion picture photography, 3D virtual environment or printed back to stock. In recent years this has also included animation (computer and traditional 2D) output to virtual environments (virtualization) for many purposes: scientific, business, gaming or other. These motion picture and virtual manipulation techniques have been 2D (two-dimensional physical form) or virtual (only existing in digital form) i.e., no physical existence. The present invention seeks to provide a 3D process of animation for physical and virtual (digital) forms.

SUMMARY

In one implementation, the present disclosure includes a system for creating an animation including a non-transitory memory storing an executable code, a hardware processor executing the executable code to receive a first scene input including a plurality of scene elements from an input device, create a three-dimensional (3D) digital representation of each of the plurality of scene elements in the first scene input, transmit the 3D digital representation of the plurality of scene elements in the first scene input for physical production, receive a first scene capture depicting the physical 3D reproductions of the plurality of scene elements of the first scene input arranged to recreate the first scene input from a recording device, process the first scene capture for display, and transmit the first scene capture for display.

In some implementations, the system further comprises a 3D production device for producing 3D models of the 3D digital representation of the plurality of scene elements and a scene capture device and a recording device, wherein, after the hardware processor transmits the 3D digital representation, the hardware processor further executes the executable code to create a physical 3D reproduction of the plurality of scene elements in the first scene input with the 3d production device, and record a scene capture depicting the physical 3D reproductions of the plurality of scene elements of the first scene input arranged to recreate the first scene input with the recording device.

In some implementations, the 3D production device is one of an additive production device and a subtractive production device.

In some implementations, the hardware processor further executes the executable code to receive a second scene input including a plurality of second scene elements from the input device, create a three-dimensional (3D) digital representation of each of the plurality of second scene elements in the second scene input, transmit the 3D digital representation of the plurality of second scene elements in the second scene input for physical production, receive a second scene capture depicting the physical 3D reproductions of the plurality of second scene elements of the second scene input arranged to recreate the second scene input from the recording device, process the second scene capture for display, and transmit the second scene capture for display.

In some implementations, the system further comprises a display and the hardware processor further executes the executable code to display the first scene capture and the second scene capture sequentially on the display.

In some implementations, the input device is one of a still camera, a video camera, and a computer running a graphics program.

In some implementations, the recording device is one of a still camera, a video camera, and a 3D scanner.

In some implementations, processing the first animation for display includes one of creating an animation by arranging the first scene capture with a plurality of other scene captures for sequential display and virtualizing the first scene capture for inclusion in a video game or other virtual user experience.

DETAILED DESCRIPTION

Figure 1:
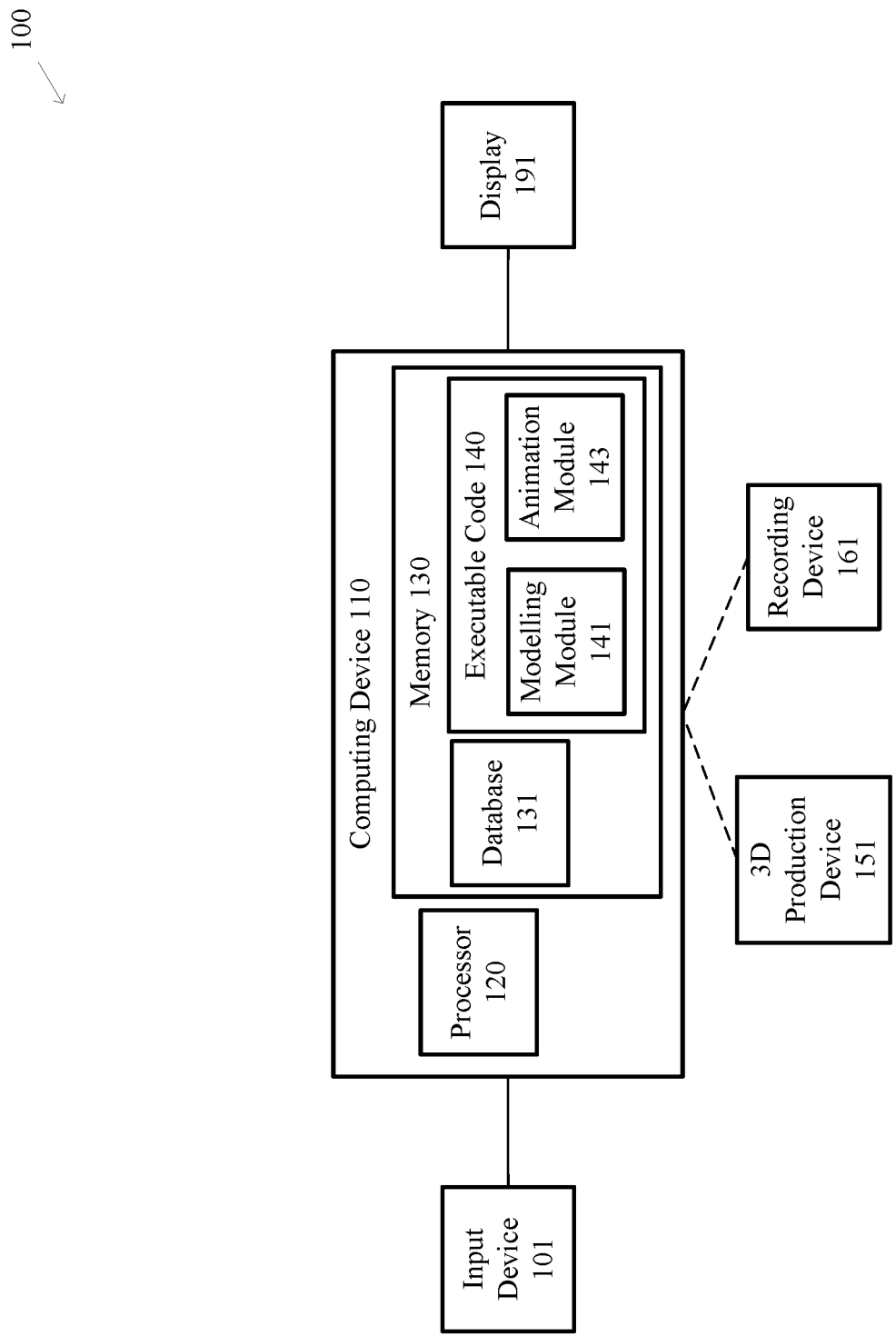
FIG. 1 shows a diagram of a system for animation, according to one implementation of the present disclosure.

The following description contains specific information pertaining to implementations in the present disclosure. The drawings in the present application and their accompanying detailed description are directed to merely exemplary embodiments. Unless noted otherwise, like or corresponding elements among the figures may be indicated by like or corresponding reference numerals. Moreover, the drawings and illustrations in the present application are generally not to scale and are not intended to correspond to actual relative dimensions.

FIG. 1 shows a diagram of a system for animation, according to one implantation of the present disclosure. System 100 includes input device 101, computing device 110, 3D production device 151, recording device 161, and display 191. Input device 101 may be an input device for transmitting a scene for animation to computing device 110. In some implementations, input device 101 may be a camera, such as a still camera, for capturing an image of a drawing or design for animation. In other implementations, input device 101 may be a computer running a graphic program for graphic design, drawing, or designing on a computer.

Computing device 110 is a computing system for use in creating animations. As shown in FIG. 1, computing device 110 includes processor 120, and memory 130. Processor 120 is a hardware processor, such as a central processing unit (CPU) found in computing devices. Memory 130 is a non-transitory storage device for storing computer code for execution by processor 120, and also for storing various data and parameters. As shown in FIG. 1, memory 130 includes database 131 and executable code 140. Database 131 is a database for storing data and information accessible and usable by processor 120. Executable code 140 may include one or more software modules for execution by processor 120. As shown in FIG. 1, executable code 140 includes modelling module 141 and animation module 143.

Modelling module 141 is a software module stored in memory 130 for execution by processor 120 to create three-dimensional (3D) representations of various elements of input received from input device 101. In some implementations, modelling module 141 may receive an analog input and create a digital 3D model based on the analog input. Modelling module 141 may use sequential input images to construct a 3D model of a scene. In other implementations, modelling module 141 may receive 3D input and may transfer the input for 3D production, or modelling module 141 may receive a 3D input and may convert the 3D input to a different format that may be used to create a 3D production of the scene received from input device 101. Modelling module 141 may create a 3D model of a two-dimensional (2D) scene based on multiple sequential or alternate images of the scene.

Animation module 143 is a software module stored in memory 130 for execution by processor 120 to process scene capture information for display. In some implementations, scene capture information may include a 3D virtualization of a 3D model of the scene received from input device 101. Animation module 143 may process one or more scene captures depicting a 3D reproduction of the scene received from input device 101 to create an animation for display as a cartoon, a show, or a video game. In some implementations, animation module 143 may compile scene data to create a sequential set of animation frames for display.

Three-dimensional production device 151 may be a device for creating 3D reproductions of the scene received from input device 101. In some implementations, 3D production device 151 may be an additive production device, such as a 3D printer or other device that builds up a 3D reproduction through a constructive process. In other implementations, 3D production device 151 may be a subtractive production device, such as a numerical control machining device, a computerized numeric machining device, or other device that creates a 3D reproduction by cutting to removing material through a destructive process.

Recording device 161 may be a camera, a still camera, a video camera, or a 3D scanner. Display 191 may be a television, a projection display, a computer display, a tablet display, a mobile phone display, a virtual reality display, an augmented reality display, or other display for showing animations.

Figure 2:
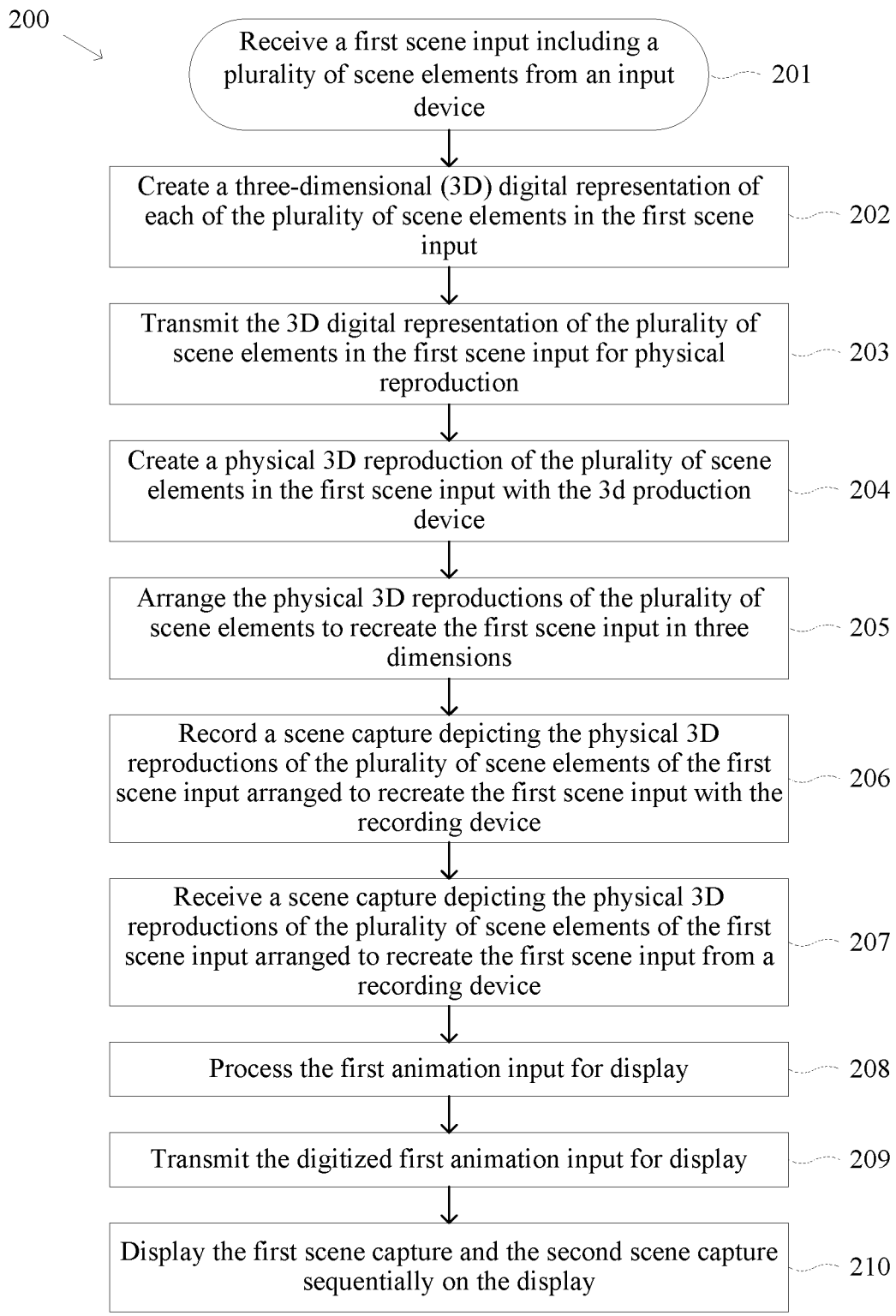
FIG. 2 shows a flow chart of an exemplary method for animation, according to one implementation of the present disclosure.

FIG. 2 shows a flow chart of an exemplary method for animation, according to one implementation of the present disclosure. Flowchart 200 begins at 201 where processor 120 receives a first scene input including a plurality of scene elements from input device 101. In some implementations, the first scene input may be a photograph of a scene, such as a hand drawing, a painting, or other artistic image. In other implementations, the first scene input may be a digital image, such as a two-dimensional (2D) image, such as a 2D computer generated image or a 3D computer generated image. Computer generated images may be computer aided drafting (CAD) images, computer drawing images, or computer amination images. The first scene input may depict a plurality of scene elements creating a scene. For example, a scene depicting a city may include buildings, cars, trees, roads, and people. Scene elements may include any visible element of a scene. In other implementations, the first scene input may be a 3D scan of a 3D scene.

At 202, processor 120 creates a 3D digital representation of each of the plurality of scene elements in the first scene input. In some implementations, modelling module 141 may use information from the first scene input to create a 3D digital representation of the scene and each of the scene elements forming the first scene. The 3D digital representation may be extracted from the scene or may be included when the first scene input is a computerized image. The 3D digital representation may extract 3D information about scene elements from relative positioning in the scene, a perspective of the scene, or by comparison with one or more previous or subsequent scene inputs. For example, modelling module 141 may compare one or more scenes preceding the first scene input or one or more scenes following the first scene input. By analyzing the movement of various scene elements the plurality of scenes relative to other scene elements, modelling module 141 may build a 3D relationship between the scene elements and a 3D digital representation of the first scene input.

In some implementations, modelling module 141 may allow a user to manipulate the 3D digital representation of the first scene input. Modelling module 141 may allow a user to manipulate elements of the 3D digital representation of the first scene input to create alternate versions of the 3D digital representation. In some implementations, the user may use the manipulation to correct scene elements of the first scene input. In other implementations, the use may manipulate the 3D digital representation to create various other scenes, such as one or more scenes preceding the first scene input or one or more scenes following the first scene input. Such manipulation or alteration may allow the user to create one or more sequential scenes in an animation. Modelling module 141 may allow the user to create a plurality of scenes in an animation from the first scene input.

At 203, processor 120 transmits the 3D digital representation of the plurality of scene elements in the first scene input for physical production. In some implementations, modelling module 141 may transmit 3D digital representations of the first scene input for physical reproduction, or modelling module 141 may transmit a 3D digital representation of the first scene input for physical reproduction. At 204, processor 120 creates a physical 3D reproduction of the plurality of scene elements in the first scene input with 3D production device 151. Three-dimensional production device 151 may be an additive production device, such as a 3D resin printer. Additive production may create a 3D reproduction of the scene elements in a constructive manner. In other implementations, 3D production device 151 may be a subtractive production device. Subtractive production may create a 3D representation of the scene elements in a destructive manner. A subtractive construction device may create the 3D reproduction of the scene elements by removing material from a blank. In some implementations, 3D production device 151 may include additive and subtractive production methods.

At 205, the physical 3D reproductions of the plurality of scene elements are arranged to recreate the first scene input in three dimensions. In some implementations, the scene elements may be arranged by a computerized process to recreate the first scene input in three dimensions. In other implementations, the user may arrange the scene elements to recreate the first scene input in three dimensions. In some implementations, the 3D reproduction of the first scene input may include a certain number of set scene elements that are fixed in relation to each other and some scene elements that are not fixed so they are positionable and repositionable in the first scene. The repositionable scene elements may be the scene elements that move relative to the fixed scene elements in one or more subsequent scenes. The fixed scene elements may remain in place and the repositionable scene elements may be placed to recreate the scene depicted in the first scene input. The repositionable scene elements may be repositioned in subsequent arrangements.

At 206, system 100 records a first scene capture depicting the physical 3D reproductions of the plurality of scene elements of the first scene input arranged to recreate the first scene input with recording device 161. In some implementations, recording device 161 records a 2D image of the 3D reproduction of the first scene input. In other implementations, recording device 161 records a 3D image or scan of the 3D reproduction of the first scene input. The recording may be in 2D or in 3D. The recording may be intended to be compiled with a plurality of other scene recordings to be arranged sequentially to create an animation, such as a film, a short, or other animated cinematic production. In other implementations, the recording may be intended for use in a digitized application, such as used in a 2D or 3D video game production. The recorded scene capture may be virtualized by computer processing for creating a virtual environment that a user may interact with in an interactive environment, such as a 3D interactive video or an interactive video game. In other implementations, the interactive environment may be an augmented reality environment or a virtual reality environment. Recording device 161 may transmit the recorded scene capture depicting the physical 3D reproductions of the plurality of scene elements of the first scene input to computing device 110.

At 207, processor 120 receives the first scene capture depicting the physical 3D reproductions of the plurality of scene elements of the first scene input arranged to recreate the first scene input from recording device 161. At 208, processor 120 process the first scene capture for display. In some implementations, processing may include creating an animation by arranging the first scene capture with a plurality of other scene captures for sequential display. In other implementations, processing may include virtualizing the first scene capture for inclusion in a video game or other virtual user experience. At 209, processor 120 transmits the animation for display. At 210, system 100 displays the animation on display 191.

From the above description, it is manifest that various systems and devices can be used for implementing the systems and devices described in the present application without departing from the scope of those concepts. Moreover, while the systems and devices have been described with specific reference to certain implementations and embodiments, a person having ordinary skill in the art would recognize that changes can be made in form and detail without departing from the scope of those improvements. As such, the described implementations and embodiments are to be considered in all respects as illustrative and not restrictive. It should also be understood that the present application is not limited to the particular implementations and embodiments described above, but many rearrangements, modifications, and substitutions are possible without departing from the scope of the present disclosure.

What is claims is:

1. A system for creating an animation including:
a non-transitory memory storing an executable code; and
a hardware processor executing the executable code to:
receive a first scene input including a plurality of scene elements from an input device;
create a three-dimensional (3D) digital representation of each of the plurality of scene elements in the first scene input;
transmit the 3D digital representation of the plurality of scene elements in the first scene input for physical production;
receive a first scene capture depicting a physical 3D reproduction of the plurality of scene elements of the first scene input arranged to recreate the first scene input from a recording device, wherein the physical 3D reproduction of the first scene input includes a first amount of scene elements that are fixed in relation to each other and a second amount of scene elements that are not fixed and are positionable and repositionable in a first scene;
process the first scene capture for display, wherein the process is directed at one of animation for motion pictures and virtualization for virtual environments; and
transmit the first scene capture for display.

2. The system of claim 1, further comprising:
a 3D production device for producing 3D models of the 3D digital representation of the plurality of scene elements; and
a scene capture device and a recording device, wherein, after the hardware processor transmits the 3D digital representation, the hardware processor further executes the executable code to:
create the physical 3D reproduction of the plurality of scene elements in the first scene input with the 3D production device; and
record a scene capture depicting the physical 3D reproductions of the plurality of scene elements of the first scene input arranged to recreate the first scene input with the recording device.

3. The system of claim 2, wherein the 3D production device is one of an additive production device and a subtractive production device.

4. The system of claim 1, wherein the hardware processor further executes the executable code to:
receive a second scene input including a plurality of second scene elements from the input device;
create a 3D digital representation of each of the plurality of second scene elements in the second scene input;
transmit the 3D digital representation of the plurality of second scene elements in the second scene input for physical production;
receive a second scene capture depicting the physical 3D reproductions of the plurality of second scene elements of the second scene input arranged to recreate the second scene input from the recording device, wherein the physical 3D reproduction of the second scene input includes a first amount of second scene elements that are fixed in relation to each other and a second amount of second scene elements that are not fixed and are positionable and repositionable in a second scene;
process the second scene capture for display; and
transmit the second scene capture for display.

5. The system as in claim 4, further comprising:
a display, wherein the hardware processor further executes the executable code to:

display the first scene capture and the second scene capture sequentially on the display.

6. The system of claim 1, wherein the input device is one of a still camera, a video camera, and a computer running a graphics program.

7. The system of claim 1, wherein the recording device is one of a still camera, a video camera, and a 3D scanner.

8. The system of claim 1, wherein processing the first scene capture for display includes one of creating an animation by arranging the first scene capture with a plurality of other scene captures for sequential display and virtualizing the first scene capture for inclusion in a video game or other virtual user experience.

9. A method for use with a system having a non-transitory memory storing an executable code and a hardware processor executing the executable code, the method comprising:
receiving, using the hardware processor, a first scene input including a plurality of scene elements from an input device;
creating, using the hardware processor, a 3D digital representation of each of the plurality of scene elements in the first scene input;
transmitting, using the hardware processor, the 3D digital representation of the plurality of scene elements in the first scene input for physical production;
receiving, using the hardware processor, a first scene capture depicting a physical 3D reproduction of the plurality of scene elements of the first scene input arranged to recreate the first scene input from a recording device, wherein the physical 3D reproduction of the first scene input includes a first amount of scene elements that are fixed in relation to each other and a second amount of scene elements that are not fixed and are positionable and repositionable in a first scene;
processing, using the hardware processor, the first scene capture for display, wherein the processing is directed at one of animation for motion pictures and virtualization for virtual environments; and
transmitting, using the hardware processor, the first scene capture for display.

10. The method of claim 9, wherein the system further comprises:
a 3D production device for producing 3D models of the 3D digital representation of the plurality of scene elements; and
a scene capture device and a recording device, wherein, after transmitting the 3D digital representation, the method further comprises:
creating the physical 3D reproduction of the plurality of scene elements in the first scene input with the 3D production device; and
recording a scene capture depicting the physical 3D reproductions of the plurality of scene elements of the first scene input arranged to recreate the first scene input with the recording device.

11. The method of claim 10, wherein the 3D production device is one of an additive production device and a subtractive production device.

12. The method of claim 9, further comprising:
receiving, using the hardware processor, a second scene input including a plurality of second scene elements from the input device;
creating, using the hardware processor, a 3D digital representation of each of the plurality of second scene elements in the second scene input;
transmitting, using the hardware processor, the 3D digital representation of the plurality of second scene elements in the second scene input for physical production;
receiving, using the hardware processor, a second scene capture depicting the physical 3D reproductions of the plurality of second scene elements of the second scene input arranged to recreate the second scene input from the recording device, wherein the physical 3D reproduction of the second scene input includes a first amount of second scene elements that are fixed in relation to each other and a second amount of second scene elements that are not fixed and are positionable and repositionable in a second scene;
processing, using the hardware processor, the second scene capture for display; and
transmitting, using the hardware processor, the second scene capture for display.

13. The method of claim 12, wherein the system further comprising:
a display, the method further comprising:
displaying the first scene capture and the second scene capture sequentially on the display.

14. The method of claim 9, wherein the input device is one of a still camera, a video camera, and a computer running a graphics program.

15. The method of claim 9, wherein the recording device is one of a still camera, a video camera, and a 3D scanner.

16. The method of claim 9, wherein processing the first scene capture for display includes one of creating an animation by arranging the first scene capture with a plurality of other scene captures for sequential display and virtualizing the first scene capture for inclusion in a video game or other virtual user experience.

17. A method comprising:
receiving a first scene input including a plurality of scene elements from an input device;
creating a 3D digital representation of each of the plurality of scene elements in the first scene input;
transmitting the 3D digital representation of the plurality of scene elements in the first scene input for physical production;
receiving a first scene capture depicting a physical 3D reproduction of the plurality of scene elements of the first scene input arranged to recreate the first scene input from a recording device, wherein the physical 3D reproduction of the first scene input includes scene elements that are fixed in relation to each other and includes scene elements that are not fixed and are positionable and repositionable in a first scene;
processing the first scene capture for display, wherein the processing is directed at one of animation for motion pictures and virtualization for virtual environments; and
transmitting the first scene capture for display.

18. The method of claim 17, further comprising:
recording a scene capture depicting the physical 3D reproductions of the plurality of scene elements of the first scene input arranged to recreate the first scene input with the recording device.

19. The method of claim 17, further comprising:
receiving a second scene input including a plurality of second scene elements from the input device;
creating a 3D digital representation of each of the plurality of second scene elements in the second scene input;
transmitting the 3D digital representation of the plurality of second scene elements in the second scene input for physical production;

receiving a second scene capture depicting the physical 3D reproductions of the plurality of second scene elements of the second scene input arranged to recreate the second scene input from the recording device, wherein the physical 3D reproduction of the second scene input includes scene elements that are fixed in relation to each other and includes scene elements that are not fixed and are positionable and repositionable in a second scene;

processing the second scene capture for display; and transmitting the second scene capture for display.

20. The method of claim 19, further comprising:

displaying the first scene capture and the second scene capture sequentially on the display.

* * * * *